United States Patent
Tanaka et al.

(10) Patent No.: US 6,604,848 B2
(45) Date of Patent: Aug. 12, 2003

(54) METHOD FOR CONTINUOUSLY MIXING POLYESTER RESINS

(75) Inventors: Tatsuya Tanaka, Takasago (JP); Kazuhisa Fujisawa, Kobe (JP); Kazuko Saka, Kobe (JP); Tomoji Takahashi, Kobe (JP); Koichi Fukushima, Kobe (JP); Yasuaki Yamane, Takasago (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 0 days.

(21) Appl. No.: 10/112,771

(22) Filed: Apr. 2, 2002

(65) Prior Publication Data

US 2002/0141282 A1 Oct. 3, 2002

Related U.S. Application Data (62) Division of application No. 09/534,394, filed on Mar. 24, 2000, now Pat. No. 6,409,949.

(30) Foreign Application Priority Data

Mar. 29, 1999 (JP) .............................. 11-086274

(51) Int. Cl.⁷ .......................... B29C 47/76; B29C 47/10
(52) U.S. Cl. .................. 366/76.1; 366/80; 366/139; 264/102; 528/308.3
(58) Field of Search ................. 264/101, 102, 264/211; 366/76.1, 79, 80, 139, 76.2; 528/308.3, 308.4, 308.5

(56) References Cited

U.S. PATENT DOCUMENTS

| 4,318,832 A | 3/1982 | Zabrocki et al. |
| 4,649,005 A | 3/1987 | Kobayashi et al. |
| 4,958,006 A * | 9/1990 | Bernier et al. |
| 5,047,188 A * | 9/1991 | Okada et al. |
| 5,227,111 A | 7/1993 | Brangers et al. |
| 5,651,927 A * | 7/1997 | Auda et al. |
| 6,165,399 A | 12/2000 | Guentherberg et al. |

FOREIGN PATENT DOCUMENTS

| EP | 0719626a | 3/1996 |
| JP | 8-183083 | 7/1996 |
| JP | 8-231750 | 9/1996 |
| JP | 10-034731 | 5/1998 |

* cited by examiner

*Primary Examiner*—Joseph Drodge
*Assistant Examiner*—Terry K. Cecil
(74) *Attorney, Agent, or Firm*—Oblon, Spivak, McClelland, Maier & Neustadt, P.C.

(57) ABSTRACT

In the case of thickening a feed resin without pre-drying, a device is taught to enhance the thickening effect. The device includes a chamber 4 having a mixing rotor therein for continuously mixing a resin between a feed port 2 and a discharge port 3. A plurality of vent ports 7 connected to vacuum pumps 8, 9 are provided for reducing the pressure in the chamber. An element, e.g. a screw feeder 10, is provided for introducing a viscosity-increasing chemical agent into the chamber. The screw feeder is isolated from the reduced pressure areas of the chamber by elements 35, e.g. reverse screw flights of the rotor. In operation, feed resin from a hopper 6 enters the chamber through port 2 and is dehydrated while being continuously mixed in a drying section 14 via vents 7. After addition of the chemical agent, the resin is continuously mixed in a thickening section 15 while being deaerated.

5 Claims, 4 Drawing Sheets

METHOD FOR CONTINUOUSLY MIXING POLYESTER RESINS

This application is a divisional of application Ser. No. 09/534,394, filed Mar. 24, 2000, now U.S. Pat. No. 6,409,949.

BACKGROUND OF THE INVENTION

1. Field of the Invention

The present invention relates to a method and apparatus for mixing a polyester resin continuously.

2. Description of the Related Art

Polyester resins are superior not only in such mechanical properties as tensile strength and impact resistance but also in heat resistance and weathering resistance, so they are applied to various uses. Particularly, polyethylene terephthalate resin (PET resin) is superior in the above properties and are light-weight in comparison with glass, so is utilized widely in the manufacture of food containers, etc.

For obtaining a high-quality product from PET resin it is necessary that the PET resin used should possess good moldability and physical properties. To this end, a certain degree or higher intrinsic viscosity value (IV value) is required. Especially, a reproduced PET resin is markedly lowered in its IV value due to, for example, the heat applied thereto during molding. Therefore, also from the standpoint of upgrading a reproduced PET resin product it is required to develop a method capable of thickening a PET resin efficiently.

However, polyester resins have a property such that their IV values are lowered by a hydrolysis by water produced on melting, thus leading to deterioration in subsequent molding characteristics of resin products.

For avoiding such an inconvenience there has been developed a continuous polyester resin mixing apparatus provided with a chamber having a material feed port and a material discharge port, mixing rotors inserted rotatably into the chamber, a vacuum pump for dehydrating the interior of the chamber under reduced pressure, a material feed means connected to the material feed port, and a chemical agent feed means connected to the chamber for adding into the chamber a chemical agent (a chain-extending agent) for increasing the viscosity of a feed resin or for suppressing a decrease of the viscosity.

According to the above continuous mixing apparatus, a polyester resin with a chain-extending agent added thereto is mixed within the chamber while being subjected to dehydration under reduced pressure, whereby the lowering of IV value can be prevented even without pre-drying the resin (see Japanese Patent Laid Open No. 8-183083, which is hereby fully incorporated by reference).

According to the above prior art, however, since a chain-extending agent is added before dehydration is performed under reduced pressure through vent openings, that is, before the feed resin begins to melt, there occur both a chain-extending reaction and a hydrolysis reaction of the feed resin simultaneously at the time of melting of the resin.

Consequently, the molecular weight of the feed resin lowers in the hydrolysis reaction during melting of the resin due to water originally contained in the resin, thus giving rise to the drawback that the degree of increase of IV value based on the chain-extending reaction becomes smaller.

It may be a countermeasure to increase the amount of the chain-extending agent to be added, taking the water originally contained in the feed resin into account. However, particularly in case of reproduced PET flakes, the amount of water is as large as several thousand ppm, so the method of improving the thickening effect by only increasing the amount of the chain-extending agent requires using a large amount of the chain-extending agent, which is uneconomical.

On the other hand, in case of a PET resin it is known that if a feed resin is dried beforehand up to a water content of not more than 50 ppm and thereafter an aromatic tetracarboxylic acid dianhydride is added, followed by mixing and melting, even reproduced or off-grade PET resins of low viscosity can be utilized effectively as foamed products (see, for example, Japanese Patent Laid Open No. 8-231750, which is hereby fully incorporated by reference).

For drying the feed resin beforehand up to the aforesaid water content it is usually required to use a batch type dryer of a large scale, thus resulting in increase of the equipment cost. Besides, in a batch type drying process the feed resin cannot be treated in a continuous manner and therefore it is necessary for the feed resin to be stored in a large quantity after drying, thus leading to an increase of the storage cost.

SUMMARY OF THE INVENTION

The present invention has been accomplished in view of the above-mentioned circumstances and it is the first object of the invention to enhance the thickening effect in a thickening process applied to a feed resin beforehand without subjecting the resin to drying in a dryer.

It is the second object of the present invention to permit both drying process and thickening process for the feed resin to be carried out continuously in case of subjecting the feed resin beforehand to drying in a dryer and thereafter to thickening and thereby reduce the feed resin storage cost.

For achieving the foregoing first object the present invention has adopted the following technical means.

According to the first aspect of the present invention, in the foregoing apparatus for mixing a polyester resin continuously, a portion of the chamber located upstream of the chemical agent feed means is used as a drying section in which the feed resin before the addition of a chemical agent thereto is subjected to mixing while being dehydrated under reduced pressure, and a portion of the chamber located downstream of the chemical agent feed means is used a thickening section in which the feed resin after the addition of the chemical agent thereto is subjected to mixing while being deaerated under reduced pressure.

Thus, in a single chamber which is continuous axially, the feed resin not containing a chemical agent (a chain-extending agent) for thickening the feed resin or for suppressing a lowering in viscosity of the feed resin is once subjected to mixing while being dehydrated under reduced pressure in the drying section and thereafter the feed resin containing the chemical agent is subjected to mixing while being deaerated under reduced pressure in the thickening section. Therefore, most of the water originally contained in the feed resin is removed in the drying section.

Thus, since the chemical agent is added in the thickening section after the water originally contained in the feed resin has been removed in the drying section, the thickening reaction is prevented from being impeded by the water originally contained in the feed resin, so that not only it is possible to increase the IV value in the thickening reaction to a greater extent than in the prior art, but also the amount of the chemical agent added can be kept to a minimum.

More specifically, given that the inside diameter of the chamber is D, an axial length of the drying section is L1 and that of the thickening section is L2, an axial length of the chamber is set so that L1/D is in the range of 15 to 25 and L2/D is in the range of 15 to 30.

The above L1/D range in the drying section is set as a length sufficient for drying feed resins which vary in the content of water. For example, in case of PET resin it is known that there occurs a thickening reaction if the water content lowers to near 50 ppm. Such a lowering of the water content can be attained by setting the L1/D ratio at 15 or more and thereby ensuring a sufficient residence time.

On the other hand, if the water content lowers to 50 ppm or thereabouts, a further dehydrating effect cannot be expected even if the drying section is made very long. Besides, the water resulting from melting of the feed resin is dehydrated under reduced pressure in the subsequent thickening section. Therefore, it is sufficient for the L1/D ratio in the drying section to be not more than 25.

A predetermined residence time is also required for improving the IV value of a polyester resin. The longer the thickening section, the longer the residence time and the larger the amount of resin capable of being treated. But in view of the strength of the mixing rotors it is impossible to make the thickening section very long. Further, from various experimental results it has turned out that a residence time of at least two minutes or so is needed in the thickening section for effecting the thickening reaction to a satisfactory extent. For these reasons there was established the above L2/D range in the thickening section.

A residence time of two minutes or more of the material to be mixed in the thickening section can be attained by providing a mixing portion having retentivity in the mixing rotor portion positioned in the thickening section. The mixing portion can be attained by a rotor segment having a feed blade and a return blade or a kneading block having reverse flights.

The adoption of such a mixing portion is desirable because a sufficient residence time is obtained at a short L/D ratio and because a compact equipment results. Further, although the material to be mixed increases its temperature by being mixed and melted and tends to be deteriorated, but its deterioration caused by an excess rise in temperature is suppressed effectively in the kneading portion constituted particularly by a rotor segment, which is desirable.

For achieving the foregoing second object the present invention has adopted the following technical means.

According to the second aspect of the present invention, in the foregoing apparatus for mixing a polyester resin continuously, the material feed means is provided with a dryer for dehydrating the feed resin, a storage hopper connected directly to the dryer and adapted to store the feed resin after drying in a moisture-proof state, and a shutter means capable of being opened and closed and disposed between the dryer and the storage hopper.

According to this apparatus, since the storage hopper is directly connected to the dryer and a shutter means is interposed therebetween, if a predetermined amount of the feed resin after dried in the dryer is fed into the storage hopper by opening the shutter means, followed by closing the shutter means and feed of the next predetermined amount of the feed resin into the dryer, the next predetermined amount of the feed resin can be dried while the preceding predetermined amount of the feed resin present in the storage hopper is subjected to a thickening process, and thus in the case where the feed resin is subjected to pre-drying and subsequent thickening, the feed resin drying process and thickening process can be carried out in a continuous manner.

In the apparatus according to the second aspect, moreover, since the feed resin is subjected to pre-drying by a dryer separate from the chamber, it is not necessary to set the L/D value of the chamber so long as in the apparatus according to the first aspect and hence it is possible to adopt a mixer whose L/D ratio is within the conventional range.

In the apparatus being considered, the dryer is not specially limited if only it has a function of drying the feed resin so as to be 50 ppm or less in water content. For example, there may be adopted a hot-air dryer in which hot air is circulated for drying or a dehumidifying dryer in which a dehumidified inert gas is circulated for drying.

DETAILED DESCRIPTION OF PREFERRED EMBODIMENTS

Embodiments of the present invention will be described in detail hereinunder with reference to the accompanying drawings.

Figure 1:
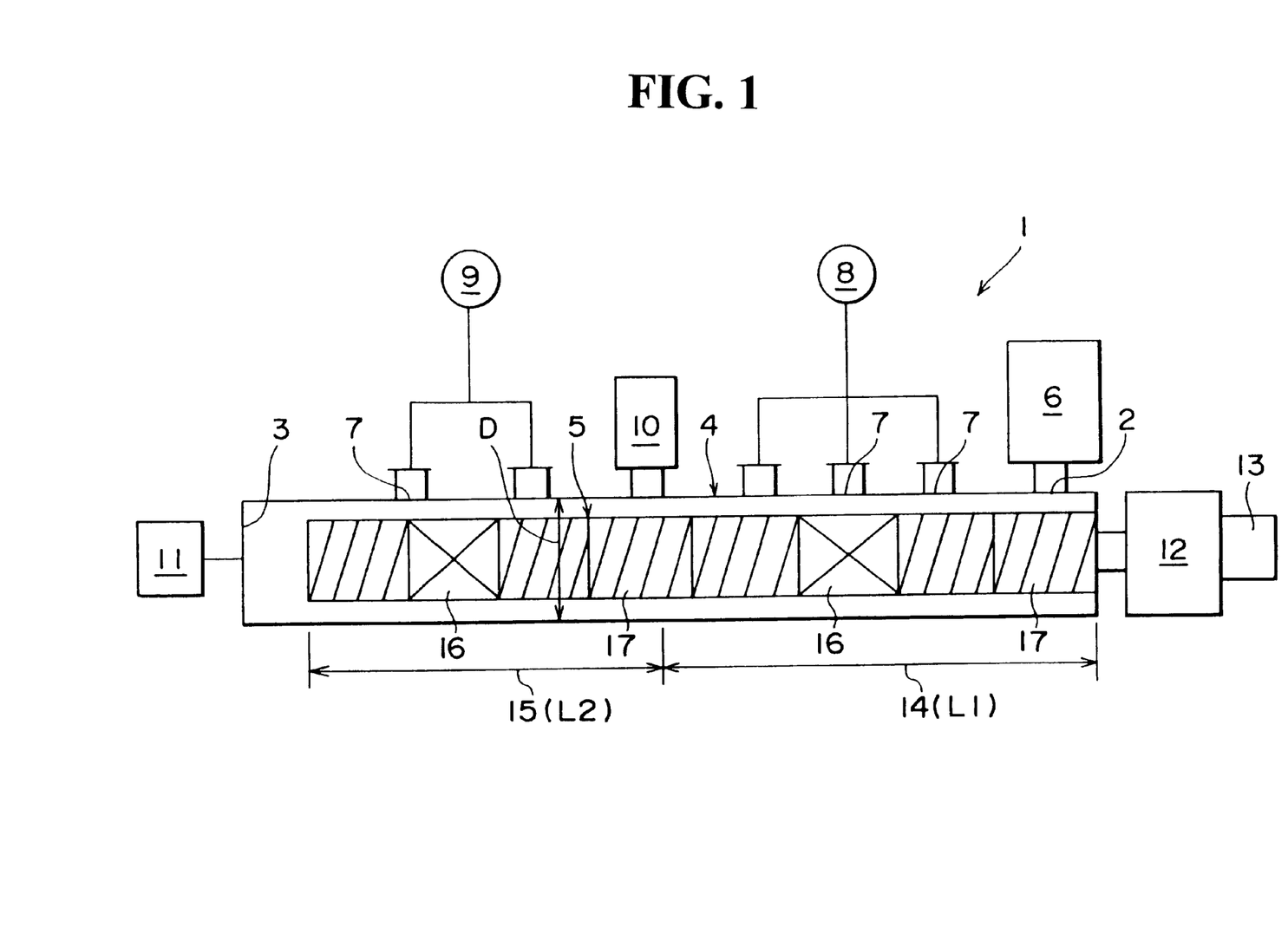
FIG. 1 is a schematic diagram of a continuous mixing apparatus according to the first embodiment of the present invention.

FIG. 1 illustrates a continuous mixing apparatus according to the first embodiment of the present invention.

The continuous mixing apparatus of this embodiment, indicated at 1, is a continuous twin-screw mixer of the type in which a feed resin is subjected to a thickening process without pre-drying in a dryer. The continuous mixer 1 is provided with a chamber 4 having a material feed port 2 and a material discharge port 3 and is also provided with a pair of right and left rotors 5 for the mixer which rotors are inserted into the chamber 4 rotatably.

To the material feed port 2 in the chamber 4 is connected a material feed means 6 constituted by a feed hopper which receives a feed resin fed from a screw feeder. In intermediate positions of the chamber 4 are formed a plurality of vent openings 7, and two vacuum pumps 8 and 9 for dehydrating the interior of the chamber 2 under reduced pressure are connected to vent openings 7. To the vent opening 7 positioned centrally of the chamber 4 is connected a chemical agent feed means 10, say, a screw feeder, for adding into the chamber 4 a chemical agent which is for increasing the viscosity of the feed resin or for suppressing a lowering in viscosity of the feed resin. A post-processing apparatus 11 such as a pelletizer or a die is connected through a pressure intensifying means such as a gear pump or a single-screw extruder to the material discharge port 3 which is positioned at a downstream-side end of the chamber 4.

The paired right and left mixing rotors 5 are connected to a reduction mechanism 12 and a motor 13 which are disposed at an upstream-side end of the chamber 4.

In this embodiment, the portion upstream of the chemical agent feed means 10 in the chamber 4 is used as a drying section 14 in which the feed resin before the addition of a chemical agent thereto is subjected to mixing while being dehydrated under reduced pressure, and the portion downstream of the chemical agent feed means 10 is used as a thickening section 15 in which the feed resin after the addition of the chemical agent thereto is subjected to mixing while being deaerated under reduced pressure.

According to this configuration, most of water originally contained in the feed resin is discharged to the exterior through vent openings 7 formed in the drying section 14 by means of the first vacuum pump 8 together with water resulting from exothermal evaporation in melting of the resin, while water and ethylene glycol produced in a chain-extending reaction after the start of a regular thickening process are discharged to the exterior through vent openings 7 formed in the thickening section 15 by means of the second vacuum pump 9.

A front half portion of the rotor 5 positioned in the drying section 14 out of both drying section 14 and thickening section 15 is provided with at least one mixing portion 16 constituted by a rotor segment having a feed blade which is twisted in the material feed direction and a return blade twisted in the material return direction. The other portion is constituted as a feed portion 17 having screw blades.

A latter half portion of the rotor 5 positioned in the thickening section 15 is also provided with at least one mixing portion 16 constituted by the above rotor segment, and the other portion is constituted as a feed portion 17 having screw blades.

Both mixing portions 16 can be constituted by a kneading block having reverse flights, and the mixing portion 16 positioned in the thickening section 15 is not specially limited insofar as it has a retentivity corresponding to a residence time of two minutes or more of the material to be mixed.

In this embodiment, if the inside diameter of the chamber 4 is D, an axial length of the drying section 14 is L1 and that of the thickening section 15 is L2, an axial length of the chamber 4 is determined so that L1/D is in the range of 15 to 25 and L2/D is in the range of 15 to 30.

This is for the following reason. It is known that there occurs a thickening reaction to a satisfactory extent if the water content lowers to near 50 ppm. And a lower of the water content to such a degree can be attained by setting the L1/D ratio to 15 or more and thereby ensuring a sufficient residence time. The reason why the L1/D ratio is set not larger than 25 is that after a decrease of the water content to near 50 ppm, a further dehydrating effect cannot be expected even if a larger length is set.

The reason why the L/D ratio is set at 15 or more is that at a smaller L/D ratio it may be impossible to thicken the feed resin effectively. Likewise, the reason why the L2/D ratio is set at 30 or less is that at a larger L/D ratio the rotor 5 becomes too long, giving rise to a problem in point of strength, and deterioration of the material after mixing may result.

These numerical values may be determined appropriately according to various conditions such as the kind of the feed resin used, whether the feed resin to be used has not previously been used or a reproduced one, and in what proportion the feed resin is in the materials subjected to mixing.

Experiments

The following description is now provided about experiments in which a polyester resin has been subjected to a thickening process actually by using the continuous mixer described above.

Experimental conditions adopted are as follows.

Reproduced PET flakes were used as a feed resin. The water content of the flakes is 5000 ppm and the IV value thereof is 0.70.

As a chemical agent (chain-extending agent) for increasing the viscosity of the resin or for suppressing a lowering of the viscosity there was used a chain extender or a polymerization catalyst. As the chain extender there was used pyromellitic acid dianhydride (a product of Daicel Chemical Co.), which was added in an amount of 1.0 wt% relative to the feed resin. As the polymerization catalyst there was used antimony trioxide, which was added in an amount of 200 ppm relative to the feed resin.

A twin-screw mixer/extruder KTX-46 (a product of Kobe Steel Co., D=46φ) was used. The degree of vacuum in the drying section 14 and that in the thickening section 15 in the twin-screw mixer/extruder were set at 20 Torr and 5 Torr, respectively.

A test mixing was performed under the above conditions while varying L1/D and L2/D ratios and the resulting mixed materials were measured for IV value, the results of which are shown in Table 1 below.

Using GPC 150C (a product of Waters Co.) and hexafluoroisopropanol as a solvent, the mixed materials were each measured for molecular weight distribution at 40° C. and the ratio of weight average molecular weight ($M_w$) to number average molecular weight ($M_n$) was determined, the results of which are shown in Table 1.

In the same table, the mark Δ represents that molten resin is difficult to assume a satisfactory filament shape, while the mark ○ represents that molten resin assumes a satisfactory filament shape, when a portion thereof is pulled up using a pincette.

TABLE 1

| | Additive | Amount | L1/D | L2/D | Temp. of the first half portion (° C.) | Temp. of the latter half portion (° C.) | Vacuum of the first half portion (Torr) | Vacuum of the latter half portion (Torr) | Liquid Quantity (kg/h) | Intrinsic Viscosity IV Value | Molecular Weight Distribution Mw/Mn | Spinnability |
|---|---|---|---|---|---|---|---|---|---|---|---|---|
| Run No. 1 | PA | 1 wt % | 20 | 30 | 280 | 270 | 20 | 5 | 20 | 0.89 | 7.8 | Δ |
| Run No. 2 | PA | 1 wt % | 20 | 30 | 280 | 265 | 20 | 5 | 50 | 0.83 | 6.5 | Δ |
| Run No. 3 | PA | 1 wt % | 12 | 30 | 280 | 265 | 20 | 5 | 50 | 0.60 | 3.5 | ○ |
| Run No. 4 | PA | 1 wt % | 20 | 22 | 280 | 265 | 20 | 5 | 50 | 0.72 | 4.8 | ○ |
| Run No. 5 | PA | 1 wt % | 20 | 40 | 280 | 265 | 20 | 5 | 50 | 0.68 | 4.3 | ○ |
| Run No. 6 | AO | 1 wt % | 20 | 30 | 280 | 270 | 20 | 5 | 20 | 0.85 | 3.7 | ○ |
| Run No. 7 | MDI | 1 wt % | 20 | 30 | 280 | 275 | 20 | 5 | 20 | 0.91 | 3.7 | ○ |

TABLE 1-continued

| | Additive | Amount | L1/D | L2/D | Temp. of the first half portion (° C.) | Temp. of the latter half portion (° C.) | Vacuum of the first half portion (Torr) | Vacuum of the latter half portion (Torr) | Liquid Quantity (kg/h) | Intrinsic Viscosity IV Value | Molecular Weight Distribution Mw/Mn | Spinnability |
|---|---|---|---|---|---|---|---|---|---|---|---|---|
| Run No. 8 | MDI | 2 wt % | 20 | 30 | 280 | 275 | 20 | 5 | 20 | 1.17 | 5.0 | ○ |
| Run No. 9 | MDI | 5 wt % | 20 | 30 | 280 | 275 | 20 | 5 | 20 | 0.91 | 3.0 | ○ |

<Explanation of Abbreviation>
PA: Pyromellitic acid dianhydride
AO: Antimony Trioxide
MDI: Liquid diphenylmethane-4,4-diisocyanate As is seen from Table 1, in Run No. 3 wherein the L1/D ratio is 12, the IV value lowers to 0.60. This is presumed to be because the water originally contained in the feed resin is not thoroughly removed in the drying section 14 and the crosslinking reaction has been obstructed by the reaction product produced in the thickening process.

Also in Run No. 5 wherein the L2/D ratio is 40, the IV value lowers to 0.68. This is presumed to be because the thickening section 15 is too long and deterioration of the PET resin has occurred in the thickening process.

Further, as is seen from a comparison among Run Nos. 2, 4 and 5, in L2/D values up to 30, the longer the thickening section 15, the more improved the IV value.

Run Nos. 3 to 6 show that it is possible to effect spinning at low IV values, and Run Nos. 7 to 9 show that it is possible to effect spinning at high IV values.

Figure 2:
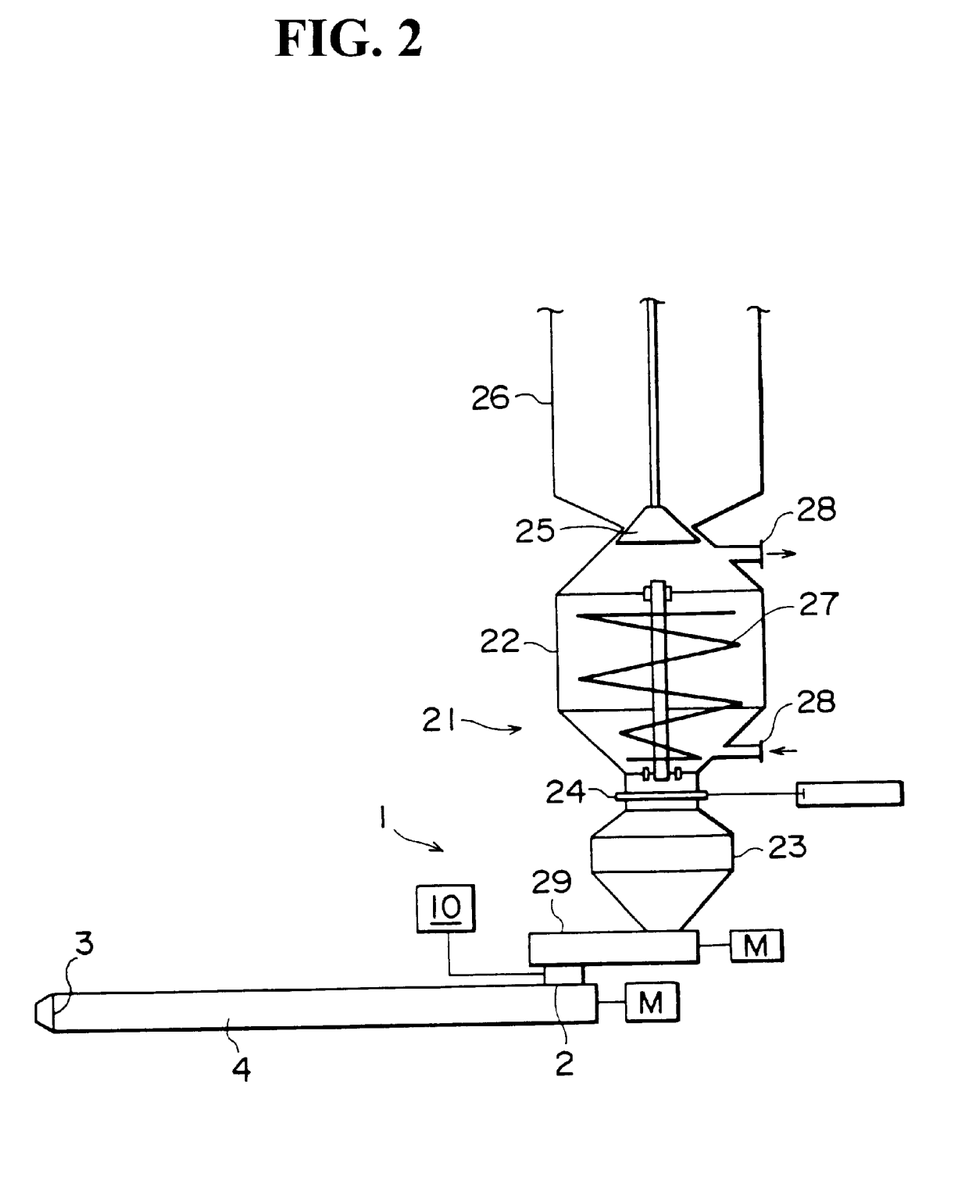
FIG. 2 is a schematic diagram of a continuous mixing apparatus according to the second embodiment of the present invention.

FIG. 2 illustrates a continuous mixing apparatus according to the second embodiment of the present invention.

This continuous mixing apparatus, indicated at 1, is a continuous twin-screw mixer of the type in which a feed resin is pre-dried in a dryer and is then subjected to a thickening process. The continuous twin-screw mixer 1 is provided with a chamber 4 having a material feed port 2 and a material discharge port 3 and is also provided with a pair of right and left rotors (not shown) for the mixer which are inserted into the chamber 4 rotatably.

A material feed means 21 which will be described later and a chemical agent feed means 10 such as a screw feeder are connected to the material feed port 2 of the chamber 4. The chemical agent feed means 10 is for adding into the chamber 4 a chemical agent which functions to increase the viscosity of the feed resin or suppress a lowering of the viscosity. A post-processing apparatus 11 such as a pelletizer or a die is connected through a pressure intensifying means such as a gear pump or a single-screw extruder to the material discharge port 3 which is positioned on a downstream-side end of the chamber 4.

In this embodiment, the material feed means 21 is provided with a dryer 22 for removing water from the feed resin, a storage hopper 23 which is connected directly to a lower end of the dryer 22 and which stores the feed resin in a dehumidified dry condition, and a shutter means 24 which is interposed between the dryer 22 and the storage hopper 23 and which can be opened and closed. The shutter means 24 is provided with a closure plate inserted horizontally movably into a connection opening between the dryer 22 and the storage hopper 23 and is also provided with an actuator such as a hydraulic cylinder for opening and closing the closure plate.

A feed hopper 26 having an opening/closing valve 25 is connected to an upper end of the dryer 22. Agitating blades 27 for agitating the feed resin are mounted rotatably in the interior of the dryer 22. Hot air feed/discharge ports 28 are formed in upper and lower end portions of the dryer 22. The feed resin present in the dryer 22 is dried by feeding and discharging hot air of about 160° C. through the feed/discharge ports 28.

The dryer 22 is not specially limited if only it has a function of drying the feed resin so as to give a water content of not higher than 50 ppm. Other than drying by circulation of hot air there may be adopted another drying method wherein a dehumidified inert gas is circulated through the feed/discharge ports 28.

A constant volume feed means 29 such as a screw feeder is connected to a lower-end opening of the storage hopper 23, with a discharge port of the feed means 29 being connected to the material feed port 2 of the chamber 4.

For using the continuous mixer 1 of this embodiment, only a predetermined amount of the feed resin such as reproduced PET flakes is fed to the feed hopper 26 and the opening/closing valve 25 is opened in a closed state of the shutter means 24, allowing the feed resin to be fed to the dryer 22.

Thereafter, when the hot air drying is completed, the shutter means 24 is opened, allowing a predetermined amount of the resin in a dry condition to be fed into the storage hopper 23, and the resin is forced into the chamber 4 by the constant volume feed means 29, in which the resin is subjected to a thickening process.

While the thickening process is carried out, the next predetermined amount of the feed resin is fed to the dryer 22 from the feed hopper 26 and is subjected to a drying process. Then, just before completion of the thickening process for the previous predetermined amount of the feed resin, the predetermined amount of the feed resin after drying is fed into the storage hopper 23.

In this embodiment, the number of revolutions of the mixing rotors and the amount of hot air to be fed and that to be discharged are set so that the amount of the feed resin dried in the dryer 22 and that thickened in the chamber 4 become almost equal to each other.

Thus, according to this embodiment, while the initial predetermined amount of the feed resin is subjected to the thickening process in the storage hopper 23, the next predetermined amount of the feed resin can be dried, so that in the case where the feed resin is pre-dried in the dryer 22 and is then subjected to the thickening process, it is possible to carry out the drying process and the thickening process for the feed resin in a continuous manner.

In this second embodiment, moreover, since the feed resin is pre-dried in the dryer 22 which is separate from the chamber 4, it is not necessary to make the L/D value of the chamber 4 so large as in the first embodiment and it is possible to adopt a mixer falling under the L/D range usually adopted.

Also in this second embodiment, vacuum pumps may be connected to vent holes in the chamber 4 to discharge the reaction product produced in the thickening process.

The chemical agent feed means 10 may be connected to any other component (say, the storage hopper 23) than the chamber 4 insofar as it can feed a chemical agent at a stage where the drying of the feed resin has been completed (more specifically, 50 ppm or less in terms of water content).

Figure 3:
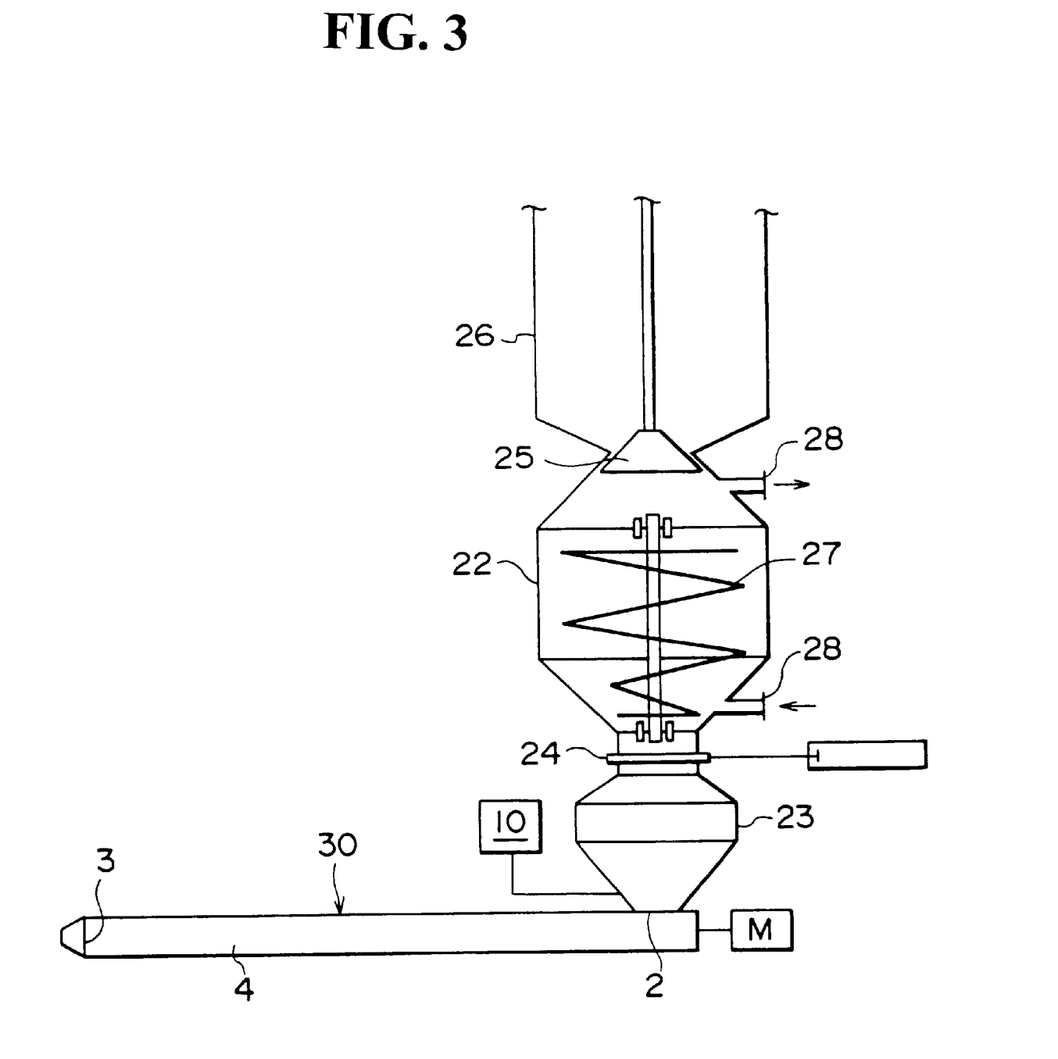
FIG. 3 is a schematic diagram of a continuous mixing apparatus according to a modification of the second embodiment.

FIG. 3 illustrates a continuous mixer 1 according to a modification of the second embodiment. The continuous mixer 1 adopts a single-screw mixer/extruder 30 as a mixer/extruder. Although in this modification the constant volume feeder 29 for feeding a feed material forcibly is not provided, it may be used if necessary.

Figure 4:
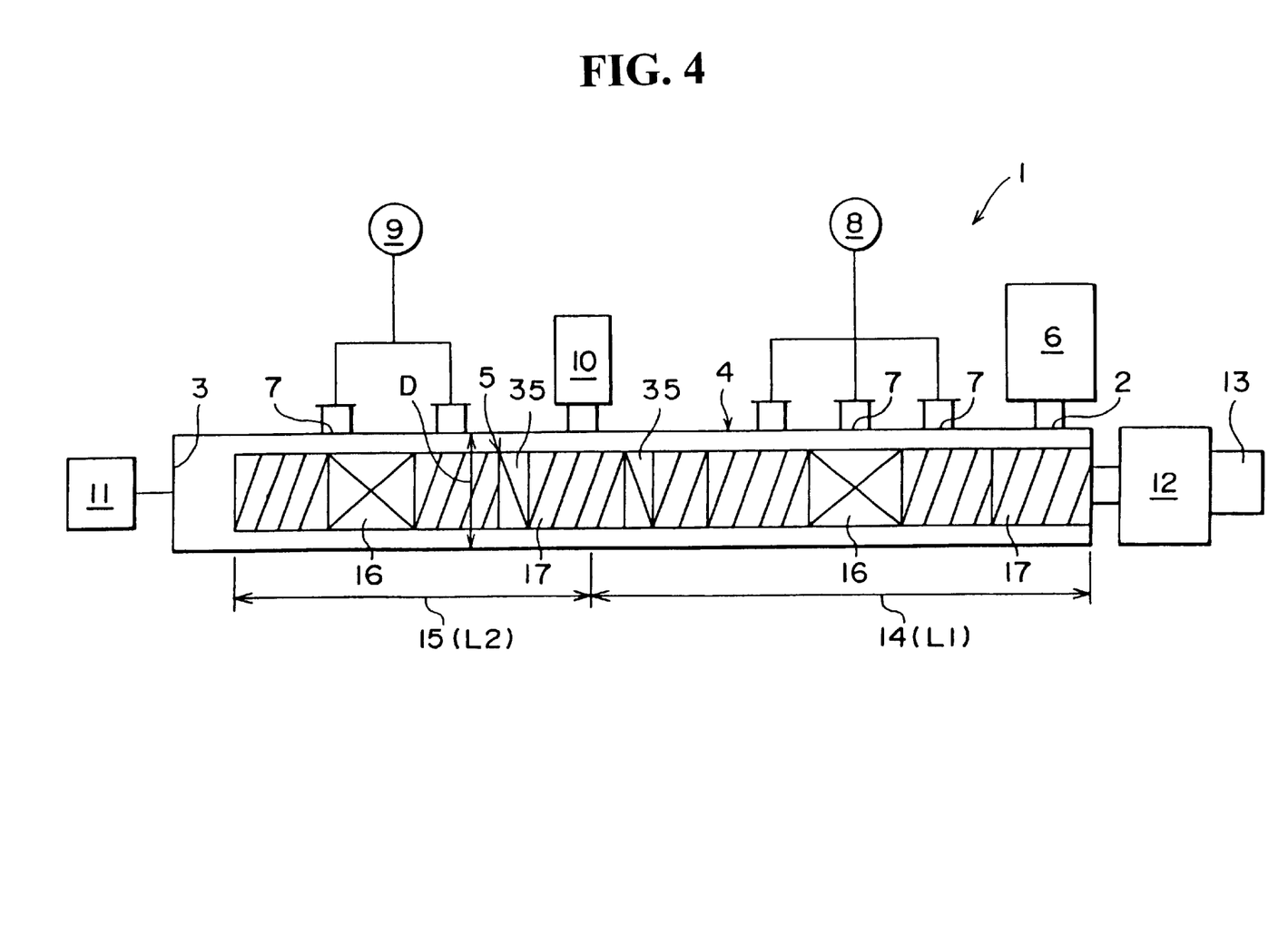
FIG. 4 is a schematic diagram of a continuous mixing apparatus according to a modification of the first embodiment.

FIG. 4 illustrates a modification of the first embodiment.

In this modification, a resin filling means 35 is provided upstream of the chemical agent feed means 10 and downstream of the downmoststream vent opening 7 connected to the drying section 14. Thus, since the resin filling means 35 is disposed between the chemical agent feed means 10 and the vent opening 7 in the drying section 14 connected to the vacuum pump 8, it is possible to feed a chemical agent without being influenced by the drying section 14. In more particular terms, the resin filling means 35 causes the interior of the chamber to be filled with resin, allowing the drying section 14 and the chemical agent feed means 10 to be cut off from each other by the resin. Consequently, it is possible to prevent the chemical agent which has been fed from being sucked from the vent openings 7 in the drying section 14 and vanishing and thus possible to effect a chemical agent supply in a constant quantity.

In this modification, the resin filling means 35 is also provided downstream of the chemical agent feed means 10 and upstream of the upmoststream vent opening 7 connected to the thickening section 15. Thus, since the resin filling means 35 is disposed between the chemical agent feed means 10 and a vent opening 7 in the thickening section connected to a vacuum pump, it is possible to effect a chemical agent supply in a constant quantity for the same reason as above. Though not shown in FIG. 4, for intimate mixing between the chemical agent and the feed resin, the provision of a mixing portion between the resin filling means 35 and the chemical agent feed means 10 is preferred because the fed chemical agent and resin can react with each other to a thorough extent.

The resin filling means as referred to herein indicates means capable of filling the interior of the chamber with resin and is not specially limited. For example, a reverse flight or a kneading disc is suitable.

Examples of polyester resins capable of being treated in the present invention include both polyester resins which have not been used yet, as well as reproduced polyester resins.

As constituents of polyesters are mentioned aliphatic, alicyclic, or aromatic dicarboxylic acids and diols, or homopolyesters or copolyesters (copolymers) derived from hydroxycarboxylic acids.

As suitable examples of aliphatic carboxylic acids are mentioned suberic acid, oxalic acid, malonic acid, dimethylmalonic acid, succinic acid, pimelic acid, adipic acid, sebacic acid, azelaic acid, and dimerum acid.

As suitable examples of alicyclic dicarboxylic acids are mentioned 1,3-cyclobutanedicarboxylic acid, 1,3- cyclopentanedicarboxylic acid, 1,3- and 1,4-cyclohexanedicarboxylic acids, 1,3 and 1,4-(dicarboxymethyl) cyclohexane, and 4,4-dicyclohexyldicarboxylic acid.

As suitable examples of aromatic dicarboxylic acids are mentioned terephthalic acid, isophthalic acid, o-phthalic acid, 1,3-, 1,4-, 2,6- or 2,7-naphthalenedicarboxylic acid, 4,4-diphenyldicarboxylic acid, 4,4-benzophenonedicarboxylic acid, and 4,4-diphenyl ether dicarboxylic acid.

As dicarboxylic acids, aromatic dicarboxylic acids are preferred. Particularly, terephthalic acid and isophthalic acid are preferred.

As suitable examples of aliphatic diols are mentioned ethylene glycol, 1,2- and 1,3-propylene glycols, 1,2-, 1,3-, 2,3- or 1,4-butanediol, pentyl glycol, neopentyl glycol, 1,6-hexanediol, 1,12-dodecanediol, and diethylene glycol.

As suitable examples of alicyclic diols are mentioned 1,4-dihydroxycyclohexane and 1,4-bis (hydroxymethyl) cyclohexane.

As suitable examples of aromatic-aliphatic diols are mentioned p-xylene glycol, 2,5-dichloro-p-xylene glycol, and 2,2-(β-hydroxyethoxyl)propane.

As diols, alkylene glycol, 1,4-dihydroxycyclohexane, and 1,4-bis (hydroxymethyl) cyclohexane are preferred, with ethylene glycol and 1,4-butanediol being particularly preferred.

The "chain extender" used as an additive is a generic term for compounds which react with OH and COOH groups at polyester ends and extend the molecular chain.

As examples of the chain extender are mentioned such aromatic tetracarboxylic acid dianhydrides as pyromellitic acid dianhydride, 2,2-bis (3,4-dicarboxyphenyl) propane dianhydride, 3,3',4,4'-benzophenonetetracarboxylic acid dianhydride, 3,3',4,4'-biphenyltetracarboxylic acid dianhydride, hydroxydiphthalic acid dianhydride, bis(3,4-dicarboxyphenyl) ether dianhydride, and (diphenyltetracarboxyl) sulfone dianhydride.

As examples of aliphatic tetracarboxylic acid dianhydrides are mentioned cyclobutane-1,2,3,4-tetracarboxylic acid dianhydride, cyclopentanetetracarboxylic acid dianhydride, and tetrahydrofurantetracarboxylic acid dianhydride. Particularly, aromatic tetracarboxylic acid dianhydrides are preferred.

As examples of diepoxy compounds are mentioned diglycidyl terephthalate and bisphenol A diglycidyl ether. As examples of isocyanate compounds are mentioned diphenylmethane-4,4'-diisocyanate, 1-methylbenzene-2,4-diisocyanate, and hexane-1,6-diisocyanate.

The chain extender described above may be used not only alone but also in combination with a catalyst for accelerating the reaction. For example, a diepoxy compound and an imidazole compound may be used together.

The polymerization catalyst used as an additive functions to extend the recurring unit of polyester by the removal of ethylene glycol. As the polymerization catalyst there may be used, for example, antimony trioxide or germanium dioxide.

It is optional whether both chain extender and polymerization catalyst are to be used or only one of the two is to be used, as a chemical agent for increasing the viscosity or for suppressing a lowering of the viscosity. Their quantities can be adjusted appropriately according to various factors such as the type of the feed resin used and the processing time.

As the chain extender, any of those referred to above may be used without any special limitation, but the use of diphenylmethane-4,4-diisocyanate is particularly preferred because of a high intrinsic viscosity and because there is obtained a polymer which is uniform in chain length (that is, the molecular weight distribution Mw/Mn is small).

According to the present invention, as set forth above, since in a series of chamber portions the feed resin is once subjected to mixing while being dehydrated under reduced pressure without the addition thereto of a chemical agent having a thickening effect and thereafter the chemical agent is added to the feed resin, followed by mixing under dehydration at a reduced pressure, the thickening effect of the feed resin can be further enhanced in the case where the feed resin is subjected to the thickening process without pre-drying in a dryer.

According to the present invention, moreover, in the case where the feed resin is pre-dried in a dryer and is thereafter thickened, the feed resin drying process and thickening process can be carried out in a continuous manner, so it is possible to reduce the storage cost of the feed resin.

What is claimed is:

1. A continuous mixing apparatus for mixing a polyester resin continuously, comprising:
    a chamber (4) having a material feed port (2) and a material discharge port (3);
    a mixing rotor (5) inserted into said chamber rotatably;
    a plurality of vent openings (7) connected to vacuum pumps for reducing the internal pressure of said chamber;
    a material feed means (6) connected to said material feed port;
    a chemical agent feed means (10) connected to said chamber (4) and adapted to feed into the chamber a chemical agent which is for increasing the viscosity of a feed resin or for suppressing a lowering in viscosity of the feed resin;
    a drying section (14) located in said chamber on an upstream side of said chemical agent feed means, wherein at least one of said vent openings is connected to said drying section;
    a thickening section (15) located in said chamber on a downstream side of the chemical agent feed means, wherein at least one of said vent openings is connected to said thickening section;
    at least one first resin filling means located in said chamber upstream of said chemical agent feed means and downstream of the vent opening connected to the drying section; and
    at least one second resin filling means located in said chamber downstream of said chemical agent feed means and upstream of the vent opening connected to the thickening section;
    wherein in said drying section the feed resin, before the addition of said chemical agent thereto, is subjected to mixing while being dehydrated under reduced pressure, and in said thickening section the feed resin, after the addition of the chemical agent thereto, is subjected to mixing while being deaerated under reduced pressure, and wherein said apparatus does not have a chemical agent feed means upstream of said drying section.

2. A continuous mixing apparatus according to claim 1, wherein, given that the inside diameter of said chamber (4) is D, an axial length of said drying section is L1, and an axial length of said thickening section (15) is L2, L1/D is in the range of 15 to 25 and L2/D is in the range of 15 to 30.

3. A continuous mixing apparatus according to claim 1, further including:
    said resin filling means disposed upstream and downstream respectively of said chemical agent feed means so that the chemical agent can be fed from said chemical agent feed means into said chamber held substantially in an unreduced state of pressure.

4. A continuous mixing apparatus according to claim 1, wherein said resin filling means is a reverse flight or a kneading disc.

5. A continuous mixing apparatus according to claim 1, further including:
    a mixing portion provided in the mixing rotor positioned in said thickening section,
    wherein said mixing portion is a rotary segment having a feed blade and a return blade or a kneading block having a reverse flight.

* * * * *